United States Patent

Romanauskas

[11] Patent Number: 5,921,150
[45] Date of Patent: Jul. 13, 1999

[54] IMBALANCE TOLERANT DRIVE SYSTEM FOR A ROTATING APPARATUS

[75] Inventor: William Andrew Romanauskas, Southbury, Conn.

[73] Assignee: Sorvall Products, L.P., Newtown, Conn.

[21] Appl. No.: 08/790,240

[22] Filed: Jan. 28, 1997

[51] Int. Cl.[6] .............................. F16F 15/10; B04B 9/14
[52] U.S. Cl. .............................................. 74/574; 494/82
[58] Field of Search ................................ 74/574; 494/82

[56] References Cited

U.S. PATENT DOCUMENTS

| | | |
|---|---|---|
| 3,938,354 | 2/1976 | Lehman . |
| 4,236,426 | 12/1980 | Meinke et al. . |
| 4,846,773 | 7/1989 | Giebeler et al. . |
| 5,026,341 | 6/1991 | Giebeler . |
| 5,291,975 | 3/1994 | Johnson et al. ............. 74/574 X |

FOREIGN PATENT DOCUMENTS

| | | | |
|---|---|---|---|
| 123783 | 10/1978 | Japan ......................... | 74/574 |
| 750176 | 7/1980 | U.S.S.R. ..................... | 74/574 |
| 1650256 | 5/1991 | U.S.S.R. ..................... | 494/82 |

OTHER PUBLICATIONS

Article entitled "Magnetostrictive Transducers Would Sense and Damp Vibrations" as appeared in Nasa Tech Briefs, vol. 20 No. 10, Oct. 1996, pp. 42, 44.

Article entitled *Smoothing Out Bad Vibes* by David L. Platus as appeared in Machine Design, Feb. 26, 1993, pp. 123–126; 128; 130.

*Primary Examiner*—John A. Jeffery
*Assistant Examiner*—Mary Ann Battista
*Attorney, Agent, or Firm*—Ohlandt, Greeley Ruggiero & Perle

[57] ABSTRACT

A rotating apparatus including a shaft having a rotor mounting location disposed at a predetermined position on the shaft, the rotor mounting location subdividing the shaft into a first and a second portion, a motor for rotating the shaft connected to the first portion of the shaft, a tachometer for monitoring the rotational speed of the shaft; and a stabilizer connected to the second portion of the shaft and responsive to the tachometer for imposing an axially directed force on the shaft, to minimize vibration of the shaft at critical rotational speeds.

19 Claims, 2 Drawing Sheets

IMBALANCE TOLERANT DRIVE SYSTEM FOR A ROTATING APPARATUS

FIELD OF THE INVENTION

The present invention generally relates to a drive system for a rotating apparatus, such as a drive system for use in a centrifuge instrument.

BACKGROUND OF THE INVENTION

The drive system for a rotating apparatus (such as a centrifuge instrument) typically includes a shaft attached at one end to a motive force (e. g., an electric motor). The shaft supports a load somewhere along its length. One inherent property of such a drive system is load imbalance. Even a very small imbalance in the otherwise symmetrical mass distribution about the drive shaft can cause damaging vibrations. The magnitude of the imbalance places a load on the bearings.

This problem can be addressed by providing a degree of flexibility to the drive shaft. However, as this rotating apparatus accelerates to its operating speed the system passes through several critical speeds. A thin, elongate shaft rotating about its longitudinal axis possesses certain natural frequencies of vibration that become apparent at these critical speeds. Passage through a critical speed thus causes the drive system to vibrate, which in turn magnifies the load imposed on the bearings. This increase in load can significantly reduce the life of the bearing. In the example of a centrifuge instrument the vibration may also have a detrimental effect on the sample that is being processed within the rotor of the instrument.

Several methods have been proposed in the art to solve the problem of vibration generated during passage of a drive system of a rotating apparatus through a critical rotational speed. One solution is to attempt to damp the vibrations imposed on the system. U.S. Pat. No. 5,026,341 (Giebeler) is an example of a rotating system for use in a centrifuge instrument that restricts the deflection of the shaft, thus damping vibration.

Another solution, exemplified by the arrangement disclosed in U.S. Pat. No. 4,236,426 (Meinke et al.), is to alter the physical properties of the drive system in a speed-dependent fashion. As a result, for a first portion of the speed regime of the apparatus, the stiffness of the system is such that the critical speed lies well beyond a predetermined speed threshold. However, once the speed threshold is crossed the stiffness of the system is dynamically altered such that the critical speed of the modified drive lies at a speed that is well below the predetermined threshold. Thus, as the apparatus accelerates through its fill speed regime to its operating speed the critical speeds associated with both the original and the modified drives are avoided. In an arrangement as shown in the Meinke et al. patent, springs, dampers and/or masses are actively coupled and uncoupled in response to the changes in the deflection of the shaft. This coupling and uncoupling has the effect of altering the critical rotational speeds.

Implementation of either of the above-described expedients usually requires a complex mechanism to effect the interaction between rotating and non-rotating parts of the drive system. In either case, technical difficulties can result. Therefore, in view of the foregoing it is believed advantageous to provide an arrangement of the type which dynamically alters the stiffness of the drive system, yet which does so without undue mechanical complexity.

SUMMARY OF THE INVENTION

The present invention is directed toward a rotating apparatus having a shaft with a first and a second end. The shaft has a rotor mounting location disposed at a predetermined position therealong which subdivides the shaft into a first and a second portion. A motive source for rotating the shaft is connected to the first portion of the shaft. A tachometer monitors the rotational speed of the shaft.

In accordance with the present invention, a stabilizer is connected to the second portion of the shaft for imposing an axially directed force on the shaft. The magnitude of the axially directed force is governed in accordance with the speed of the shaft, as measured by the tachometer. The force may be an axially compressive force or an axially tensile force.

In one embodiment the force imposing stabilizer comprises a magnetostrictive device operatively coupled to the end of the second portion of the shaft. The magnitude of the current applied to the magnetostrictive device is governed in accordance with the shaft speed. In an alternate embodiment the force imposing stabilizer comprises a motor-driven screw device operatively coupled to the end of the second portion of the shaft.

BRIEF DESCRIPTION OF THE DRAWINGS

The invention will be more fully understood from the following detailed description, taken in connection with the accompanying drawings, in which.

DETAILED DESCRIPTION OF THE PREFERRED EMBODIMENTS

Figure 1:
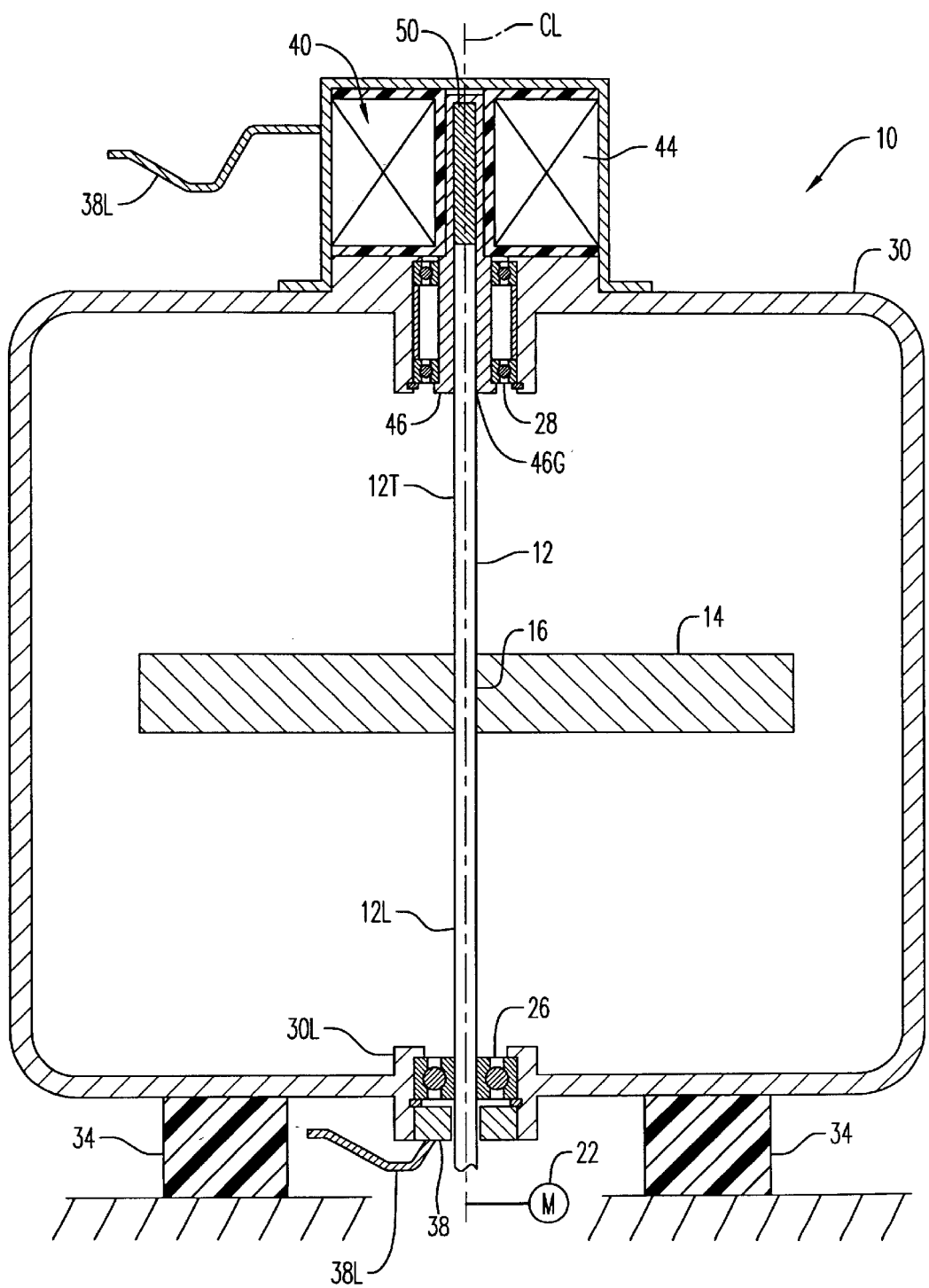
FIG. 1 is a cross-sectional view of a drive system for a rotating apparatus having a magnetostrictive device operatively coupled to the end of a rotatable shaft.

The present invention can best be described by referring to the figures, wherein FIG. 1 depicts a drive system 10 for a rotating apparatus. Drive system 10 in accordance with this invention can be used with any form of rotating apparatus, such as a centrifuge instrument or a flywheel.

Drive system 10 includes a shaft 12, which is adapted to receive a rotor 14 at a rotor mounting location 16 disposed at any predetermined convenient position along shaft 12. Preferably, rotor mounting location 16 is disposed at the midpoint of shaft 12. The rotor mounting location 16 subdivides shaft 12 into an upper portion 12T and a lower portion 12L.

One portion of shaft 12, typically the lower portion 12L, is attached to a motive source 22 (e. g., an electric motor) which serves as a source of motive force for rotating shaft 12 about an axis of rotation CL. The axis of rotation CL is shown as extending vertically through shaft 12, although it should be understood that the system of the present invention is also usefull with an apparatus in which shaft 12 is horizontally disposed. Rotation of upper portion 12T of shaft 12 is laterally supported by bushing 46, made from a suitable non-magnetic material. The lower portion 12L of shaft 12 is supported by bearing 26. Bearing 26 is rigidly fixed in its housing 30L.

Abutting upper portion 12T of shaft 12 within bushing 46 is a magnetostrictive element 50, the purpose of which will be made clearer herein. The clearance between shaft 12, element 50, and bushing 46 is defined by a gap 46G. Bushing 46 is rotatably mounted in the bearing set 28.

The apparatus includes a frame 30 through which shaft 12 extends. The structure of frame 30 forms a convenient mounting site for motive source 22 and bearings 26, 28. Frame 30 may also be vibrationally isolated from the environment by a plurality of isolator elements 34.

A tachometer 38 for monitoring the rotational speed of shaft 12 is provided. Tachometer 38 may be implemented in any convenient fashion, as is known in the art, and may be operatively associated with shaft 12 at any convenient position. A signal representative of the rotational speed of shaft 12 is output from tachometer 38 on a line 38L.

In accordance with the present invention drive system 10 further comprises a stabilizer, generally indicated by the reference character 40, for imposing an axially directed force on shaft 12. The force imposed on shaft 12 by stabilizer 40 may be an axially compressive or an axially tensile force. Stabilizer 40 is operatively connected to the portion of the shaft 12 not connected to motive source 22. In the arrangement illustrated in the Figures stabilizer 40 is thus connected to upper portion 12T of shaft 12. Bushing 46 is connected to the same portion of shaft 12 to which force imposing stabilizer 40 is connected. The magnitude of the axially directed force imposed by stabilizer 40 on shaft 12 is determined in accordance with the rotational speed of shaft 12 as determined by tachometer 38. To this end stabilizer 40 is operatively connected to output line 38L from tachometer 38.

Force imposing stabilizer 40 preferably comprises a magnetostrictive device operatively coupled to magnetostrictive element 50. The magnetostrictive device comprises a coil 44 disposed in surrounding relationship to element 50. Current passing through coil 44 generates a magnetic field which influences element 50. Element 50, being formed from a magnetostrictive alloy such as Terfenol-D produced by Etrema Products Inc., expands or contracts axially when it is under the influence of a magnetic field. The amount of expansion is a predetermined function of the intensity of the magnetic field. The intensity of the field, and thus the magnitude of the force, are determined by the magnitude of the actuating current. The magnitude of the current is, in turn, determined in accordance with the rotational speed of shaft 12, as indicated by the signal on line 38L from tachometer 38. In the illustrated embodiment, force imposing stabilizer 40 is mounted to frame 32.

In operation, as the speed of shaft 12 approaches a known critical speed, electromagnetic coil 44 is energized to apply an axial force to shaft 12. Since bottom bearing 26 is fixed, any force applied to the opposite end of shaft 12 changes the lateral stiffness thereof. By changing the stiffness of shaft 12 the location of the critical speed can be shifted away from the current operating speed. It should be appreciated that this change in stiffness occurs almost instantaneously. If the applied axial force is compressive, and its magnitude approaches that given by Euler's column formula, the lateral stiffness approaches zero.

Figure 2:
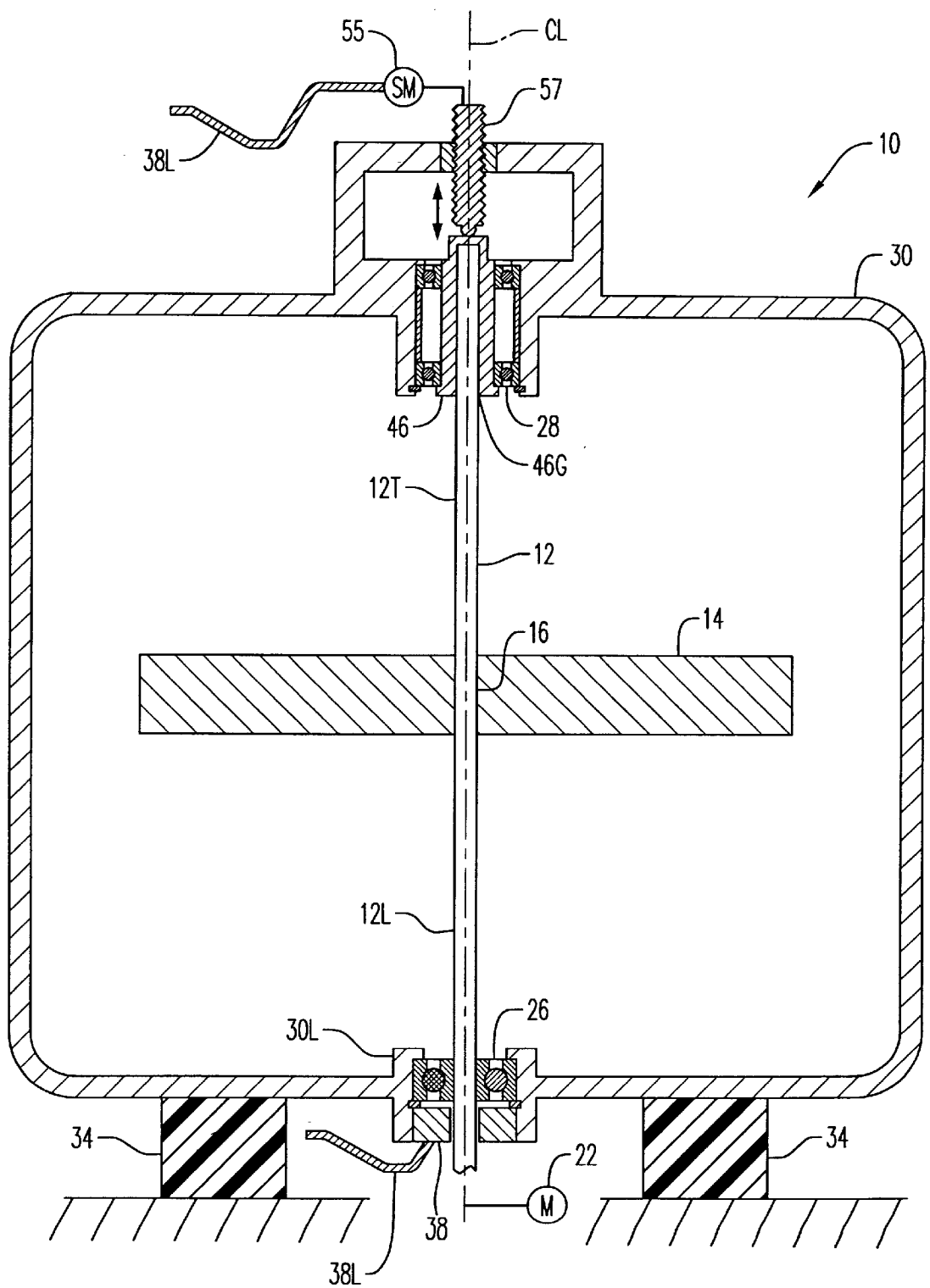
FIG. 2 is a cross-sectional view of a rotating apparatus having a motor-driven screw device operatively coupled to one end of a rotatable shaft.

In an alternate embodiment the axial force imposing stabilizer may be realized mechanically, as illustrated in FIG. 2. In this embodiment an electric motor 55 (e. g.,. a stepper type motor) drives an associated threaded element 57 that abuts the end of upper portion 12T of shaft 12. The axial displacement of threaded element 57, and thus the magnitude of the force imposed on the end of shaft 12, is determined in accordance with the speed of shaft 12. Preferably, a mechanical power screw, such as is used in a press, is used. The calculation of the force required to stabilize shaft 12 is a function of the torque applied by motor 55 to shaft 12.

Those skilled in the art, having the benefit of the teachings of the present invention, may impart numerous modifications thereto. These modifications are to be construed as lying within the contemplation of the present invention, as defined by the appended claims.

What is claimed is:

1. A rotating apparatus comprising:

a shaft having a rotor mounting location disposed at a predetermined position on said shaft, said rotor mounting location subdividing said shaft into a first and a second portion;

a motive source for rotating said shaft connected to said first portion of said shaft;

a tachometer for monitoring a rotational speed of said shaft; and a magnetostrictive device connected to said second portion of said shaft and responsive to said tachometer for imposing an axially directed force on said shaft, to minimize vibration of said shaft at critical speeds.

2. The rotating apparatus of claim 1 wherein said second portion of said shaft has and end, and wherein said magnetostrictive device is operatively coupled to said end of said second portion of said shaft.

3. The rotating apparatus of claim 2 wherein said magnetostrictive device includes an electric coil disposed around a magnetostrictive element.

4. The rotating apparatus of claim 3 wherein said electric coil generates a magnetic field about said magnetostrictive element when an actuating current is applied to said electric coil.

5. The rotating apparatus of claim 4 wherein said magnetostrictive element expands axially when said electric coil generates a magnetic field.

6. The rotating apparatus of claim 4 wherein said magnetostrictive element contracts axially when said electric coil generates a magnetic field.

7. The rotating apparatus of claim 2 wherein said magnetostrictive device imposes an axially compressive force on said shaft.

8. The rotating apparatus of claim 2 wherein said magnetostrictive device imposes an axially tensile force on said shaft.

9. A centrifuge comprising:

a rotatable shaft having two ends;

a rotor mounted about said rotatable shaft; and a magnetostrictive device operatively coupled to at least one end of said rotatable shaft for imposing an axially directed force on said shaft, to minimize vibration of said rotatable shaft as said rotatable shaft passes through at least one critical speed.

10. A rotating apparatus comprising:

a rotatable shaft having a first end and a second end;

a motor connected to said first end of said shaft to rotate said shaft;

a magnetostrictive element adapted to contact said second end of said shaft;

an electric coil surrounding said magnetostrictive element; and a tachometer connected to said shaft;

wherein when said tachometer indicates that said shaft is approaching a critical rotational speed, an electric current is sent through said electric coil, thereby generating a magnetic field sufficient to cause said magnetostrictive element to deform axially and apply an axial, stabilizing force to said rotatable shaft.

11. The rotating apparatus of claim 10, wherein said magnetic field causes said magnetostrictive element to elongate and press against said rotatable shaft.

12. The rotating apparatus of claim 10, wherein said magnetostrictive element is connected to said rotatable shaft.

13. The rotating apparatus of claim 12, wherein said magnetic field causes said magnetostrictive element to shorten and exert a tensile force on said rotatable shaft.

14. The rotating apparatus of claim 10, wherein a rotor is mounted about said rotatable shaft.

15. The rotating apparatus of claim 14, wherein said rotor is mounted about a midpoint of said rotatable shaft.

16. The rotating apparatus of claim 10, wherein said second end of said rotatable shaft is seated in a non-magnetic bushing.

17. The rotating apparatus of claim 10, further comprising a frame through which said rotatable shaft extends.

18. The rotating apparatus of claim 17, wherein said frame includes at least one isolator element to minimize vibration transfer.

19. The rotating apparatus of claim 10, wherein said first end of said rotatable shaft is seated in a fixed bearing.

* * * * *